United States Patent [19]
Coffman

[11] Patent Number: 5,878,953
[45] Date of Patent: Mar. 9, 1999

[54] PRESSURE ACTUATED CONTROL SYSTEM FOR SPRINKLER AND IRRIGATION SYSTEMS

[75] Inventor: William S. Coffman, Riverside, Calif.

[73] Assignee: Jurupa, Inc., Orange, Calif.

[21] Appl. No.: 828,950

[22] Filed: Mar. 28, 1997

[51] Int. Cl.$^6$ .................................................. A01G 25/16
[52] U.S. Cl. .................... 239/1; 239/66; 239/69
[58] Field of Search ................. 239/63, 66, 69, 239/101; 137/119.03, 119.08

[56] References Cited

U.S. PATENT DOCUMENTS

| | | | |
|---|---|---|---|
| 3,420,270 | 1/1969 | Neyer | 239/66 X |
| 3,519,016 | 7/1970 | Kah, Jr. et al. | 239/66 X |
| 3,747,620 | 7/1973 | Kah, Jr. | 239/66 X |
| 3,783,899 | 1/1974 | Fowler et al. | 239/66 X |
| 3,797,740 | 3/1974 | Kah, Jr. | 239/66 X |
| 4,407,451 | 10/1983 | Hunter | 239/66 |

*Primary Examiner*—Lesley D. Morris
*Attorney, Agent, or Firm*—Higgs, Fletcher & Mack LLP; Bernard L. Kleinke

[57] ABSTRACT

A multiple section irrigation sprinkler system incorporating pilot operated, pressure actuated and sequenced valve assemblies incorporates controllable device to increase or decrease the water pressure in the water supply lines at a controllable rate. The system includes a dump valve to relieve the water pressure during the pressure reduction cycle to eliminate or at least greatly reduce water hammer effects. The dump valve has a flow rate substantially less than the flow rate of the device for increasing or decreasing the water pressure in the water supply lines. The dump valve is prevented from transitioning from the open position to the closed position below predetermined pressure levels selected to prevent false sequencing of the pilot operated, pressure actuated and sequenced valve assemblies.

6 Claims, 5 Drawing Sheets

PRESSURE ACTUATED CONTROL SYSTEM FOR SPRINKLER AND IRRIGATION SYSTEMS

TECHNICAL FIELD

This invention relates to the operation and sequencing of multiple section irrigation sprinkler systems. More particularly, the invention relates to an improved arrangement and method for controlling pilot operated, pressure actuated and sequenced valve assemblies used to turn remotely located irrigation sprinklers on and off.

BACKGROUND ART

Multiple section irrigation sprinkler systems such as employed for golf courses, highway green belts, and farms require accurate and reliable control of the sequencing and operation of each of the multiple sections to avoid damage to vegetation. Many golf courses, for example, employ a centrally located microprocessor or computer to control electrically actuated valve assemblies for the sequencing and operation of the sprinklers in each section of the multiple section irrigation sprinkler system.

An electrically controlled irrigation sprinkler system can require many miles of underground wire that is frequently damaged by gophers, tree roots, or the like, as well as by lightning strikes during electrical storms. In many geographical areas, the frequency and severity of electrical storms limit the use of electrically controlled irrigation sprinkler systems.

Golf courses in these areas of frequent electrical storms often employ a system of hydraulically actuated valve assemblies wherein each valve assembly is connected by a network of water tubes to a central station. Computer controlled switches control the pressure in the individual water tubes as required by the programmed irrigation cycle to control each hydraulically actuated valve assembly to turn each section of the irrigation sprinkler system on and off selectively. These hydraulically operated systems are relatively immune to the effects of electrical storms, but are particularly susceptible to the damage caused by gophers and tree roots.

In an attempt to overcome such problems, pressure actuated control systems using pressure changes in the main water supply lines to control the sequencing and operation of each section of multiple section irrigation sprinkler system have been proposed, and would overcome most or all of the problems encountered with the aforementioned electric and hydraulic control systems. For example, irrigation sprinkler systems and control techniques and components are disclosed in U.S. Pat. No. 3,747,620, IRRIGATION SPRINKLER SYSTEM CONTROL EMPLOYING PILOT OPERATED, PRESSURE ACTUATED AND SEQUENCED VALVE ASSEMBLIES and in U.S. Pat. No. 3,797,740, FLUID DISTRIBUTION SYSTEM OPERATED BY PRESSURE SIGNAL. The foregoing patents are incorporated herein by reference.

However, such pressure actuated control systems introduce new unique system control problems. Such systems and techniques apparently were previously employed on several golf courses. Such pressure actuated control systems employ pilot operated, pressure actuated valve assemblies similar to the one described in U.S. Pat. No. 3,747,620. The pressure actuated valve assemblies included internal rotary cams each having 39 index positions. Additionally, each pressure actuated valve assembly included adjustable devices to select the specific cam index position for activating an associated sprinkler. The pressure actuated valve assembly also included an internal mechanism for causing the rotary cam to rotate one index position each time the water supply pressure was reduced from 60 psi to 40 psi and then was increased back to 60 psi. Thus, a series of controlled changes in the water supply pressure provided the mechanism for the complete control of the sequencing and the operation of a multiple section irrigation sprinkler system to activate and deactivate selectively the sprinklers controlled thereby.

To initiate a series of sequencing and operating cycles in such a pressure controlled irrigation sprinkler system, the central control system first reduced the water supply pressure to 12 psi. The reduced water pressure of 12 psi caused each of the pressure actuated valve assemblies to reset an internal rotary cam to the starting position. The control system next raised the water supply pressure to 90 psi to "initialize" or prepare all of the pressure actuated valve assemblies for the start of the sequencing and operating cycles. After the application of the initial 90 psi pressure, the rotary cam in each pressure actuated valve assembly would index one position each time the water supply pressure was lowered below 40 psi and then increased to over 60 psi. Each time the water supply pressure was increased to over 80 psi after an indexing operation, all of the pressure actuated valve assemblies and associated sprinklers selected by the last selected rotary cam position would turn on, while all of the remaining pressure actuated valve assemblies and associated sprinklers would remain deactivated.

Reduction of the water supply pressure from 90 psi to under 40 psi in a reasonable length of time required the operation of a pressure regulating valve to reduce the applied system pressure and the opening of a "dump valve" to relieve the pressure in the water supply line. Then, the control system operated the pressure regulating valve to increase the applied system pressure and close the dump valve to return the system water supply pressure back to 90 psi to activate the next set of sprinklers.

The opening and closing of the pressure regulating valve and the dump valve did randomly result in the effect known as "water hammer," especially in irrigation sprinkler systems that had been in long-term service. The term water hammer is defined to describe the series of sudden pressure changes caused by abrupt changes in the rate of flow of a large mass of water in a closed hydraulic system.

The water hammer effect did randomly occur when either the pressure regulating valve was operated or the dump valve was opened and closed. The water hammer effect caused the water pressure in the system to rise rapidly and unpredictably above 60 psi and then fall below 40 psi several times during a single cycle programmed to index the rotary cam only one index position in the pressure actuated valve assemblies. Thus, when the water supply pressure was lowered below 40 psi and then increased to over 60 psi, as a result of the water hammer effect, the rotary cams in the pressure actuated valve assemblies were uncontrollably indexed more than the desired single position commanded by the program in the control system. The rotary cams oftentimes were indexed as much as three positions when a change of only one index position was commanded by the control system. As a result, the operation of several sections of the multiple section irrigation sprinkler system were skipped during a regularly scheduled irrigation cycle, resulting in dead or dying grass and costly damage to the golf course.

As a result of the foregoing problems associated with the pressure actuated control system, they are no longer popular, and currently the electrically controlled irrigation systems are preferred.

Therefore, it would be highly desirable to have a new and improved pressure activated control system, which can function reliably and accurately, and eliminate undesirable malfunctioning as experienced in prior known pressure activated irrigation control systems.

DISCLOSURE OF INVENTION

The principal object of the present invention is to provide a new and improved sprinkler and irrigation pressure actuated control systems, and methods of operating them in a highly reliable manner.

Briefly, the above and further objects are realized by providing a variable frequency drive system, which controllably varies the speed of AC motors driving pumps supplying the water to the water supply lines for the pressure controlled irrigation sprinkler system. Pilot operated pressure actuated valve assemblies control sprinklers in response to pressure changes in the water supply line. The variable frequency drive system is controlled by a computer, which permits the water supply pressure to be changed quickly without the undesirable water hammer effects, and which controls the rate of change of pressure in the system water supply line.

A dump valve required to bleed off the system water pressure is sized to have a flow or discharge capacity substantially less than the pumping capacity of the variable frequency drive system controlled motor-pump unit. The computer of the present invention controls the timing of the opening and closing of the dump valve so that any changes in the water pressure caused by the opening or closing of the dump valve, occur at a water supply line pressure such that the changes in the water pressure do not exceed any of the "set points" controlling indexing of the rotary cams in the pilot operated pressure actuated valve assemblies.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
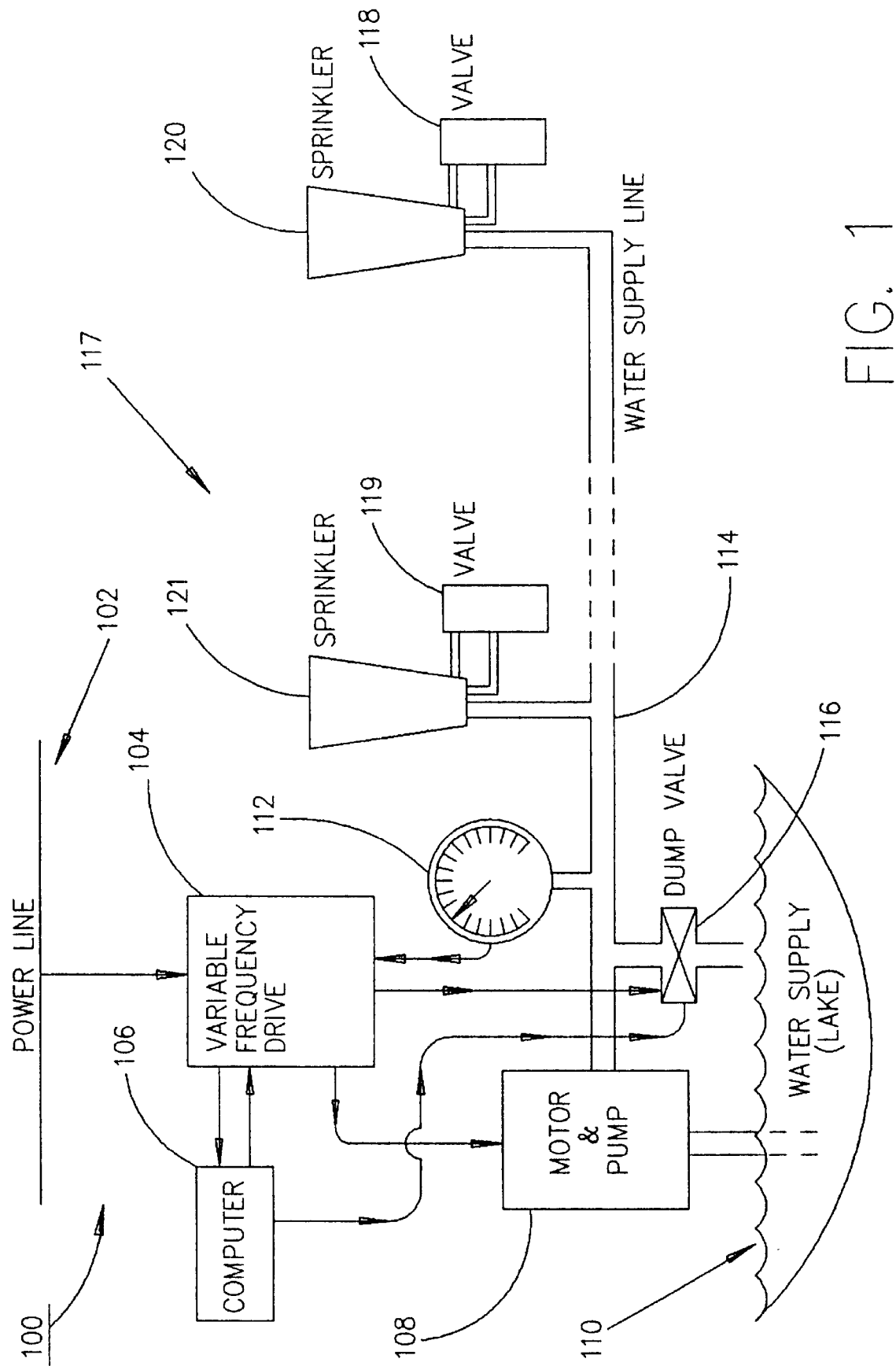
FIG. 1 is a block diagram of a sprinkler and irrigation pressure actuated control system constructed in accordance with the present invention.

Referring now to FIG. 1, there is shown an irrigation sprinkler system 100, which is constructed in accordance with the present invention. The system 100 includes a variable frequency drive 104, which is powered electrically by a power line 102, and is controlled by a computer 106 to vary the speed of an electric motor and pump assembly 108 to draw water from a water supply (lake) 110. The computer 106 may be a suitable conventional microprocessor or a programmable logic controls device. The variable frequency drive is preferably the one marketed by Allen Bradley, located at 1201 South 2nd Street, Milwaukee, Wis. 53204, under the trade name 1336 Plus. The variable frequency drive 104 controllably varies the rotational speed of the electric motor and pump assembly 108 to control the rate of change in the water pressure as well as the actual water pressure, as measured by a pressure transducer 112, in a main water supply line 114.

Figure 2:
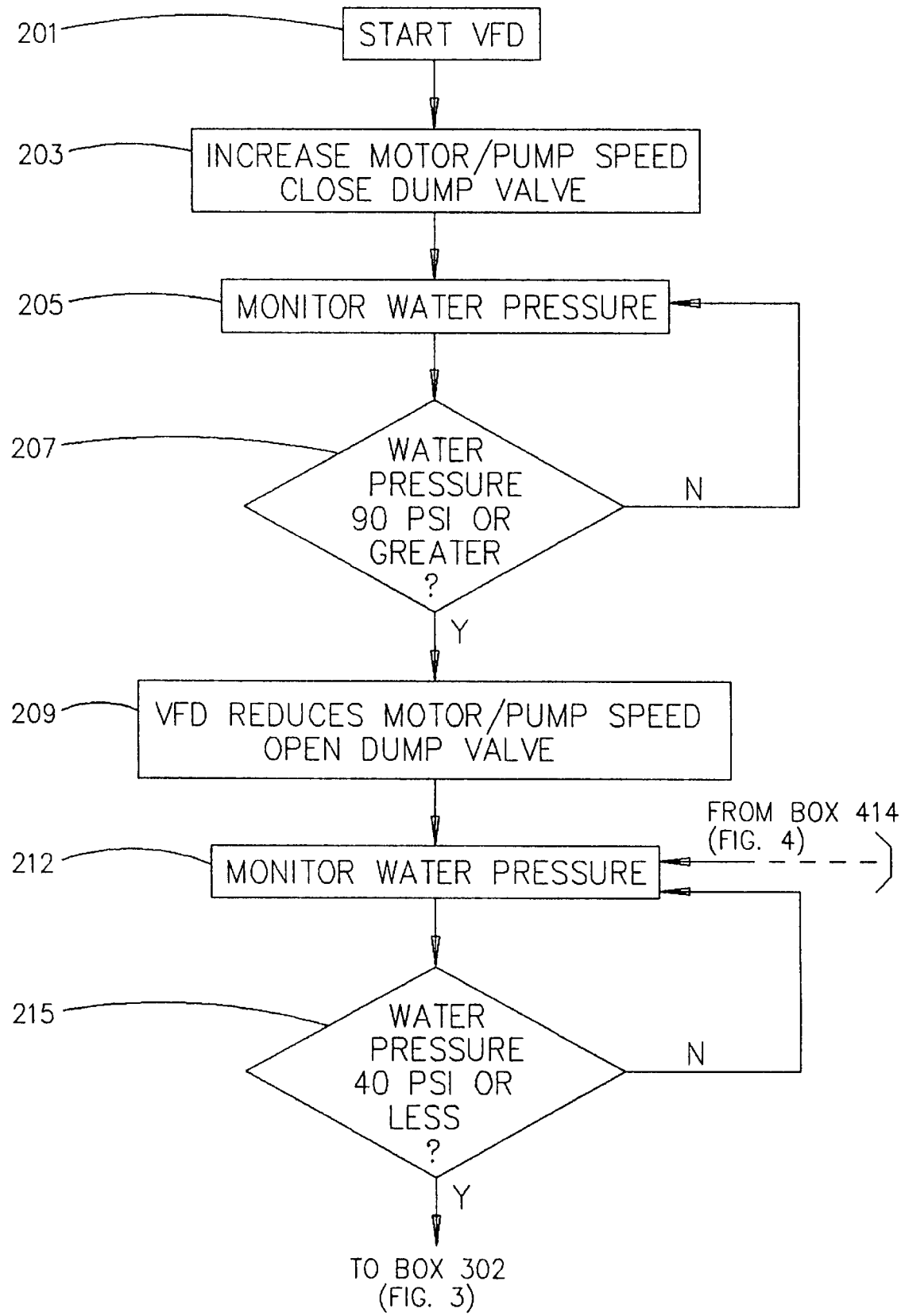
FIGS. 2 through 4 are flow chart diagrams of the method of operation of the system of FIG. 1 as controlled by the computer of the system of FIG. 1.
Figure 3:
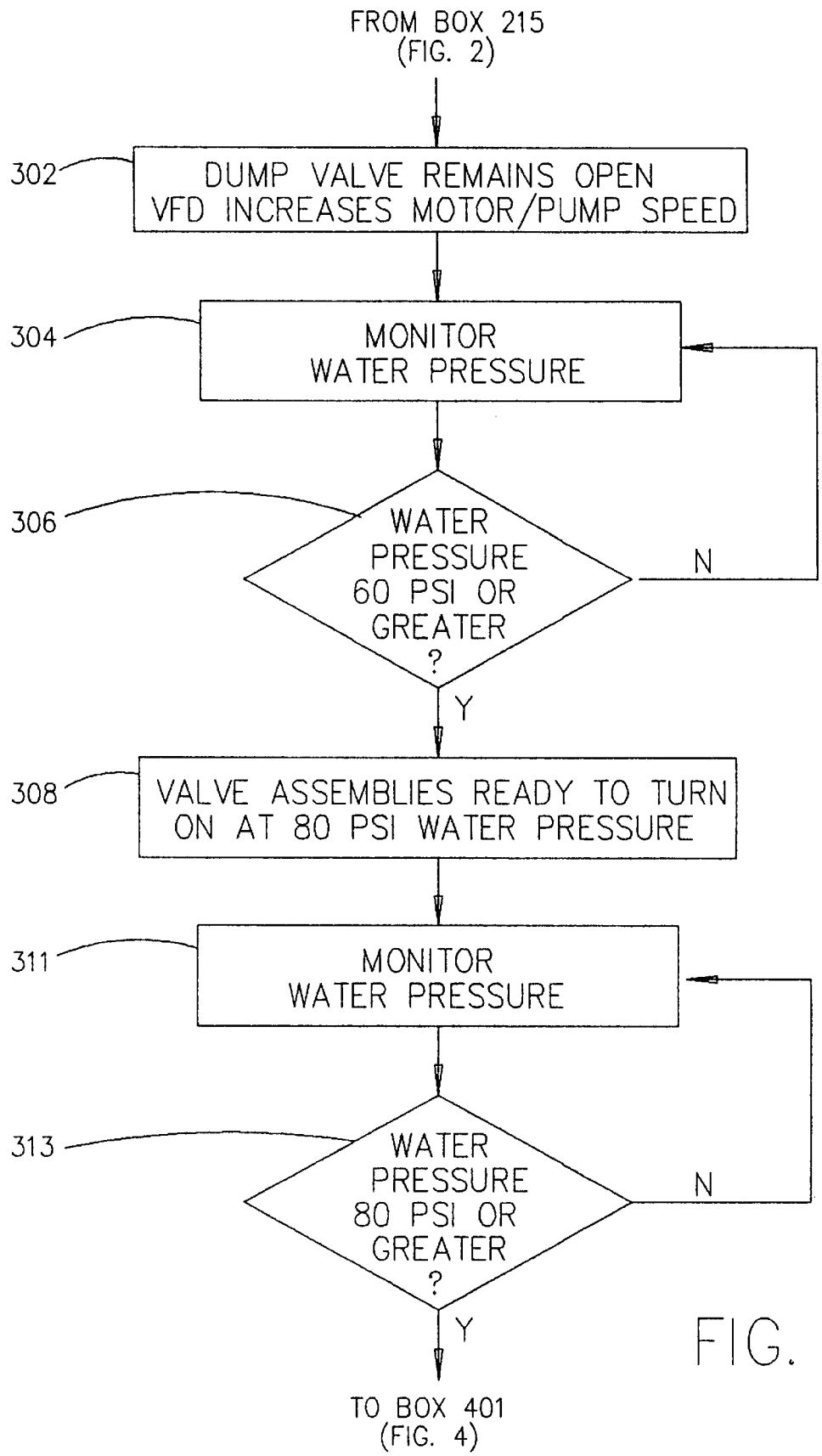
Figure 4:
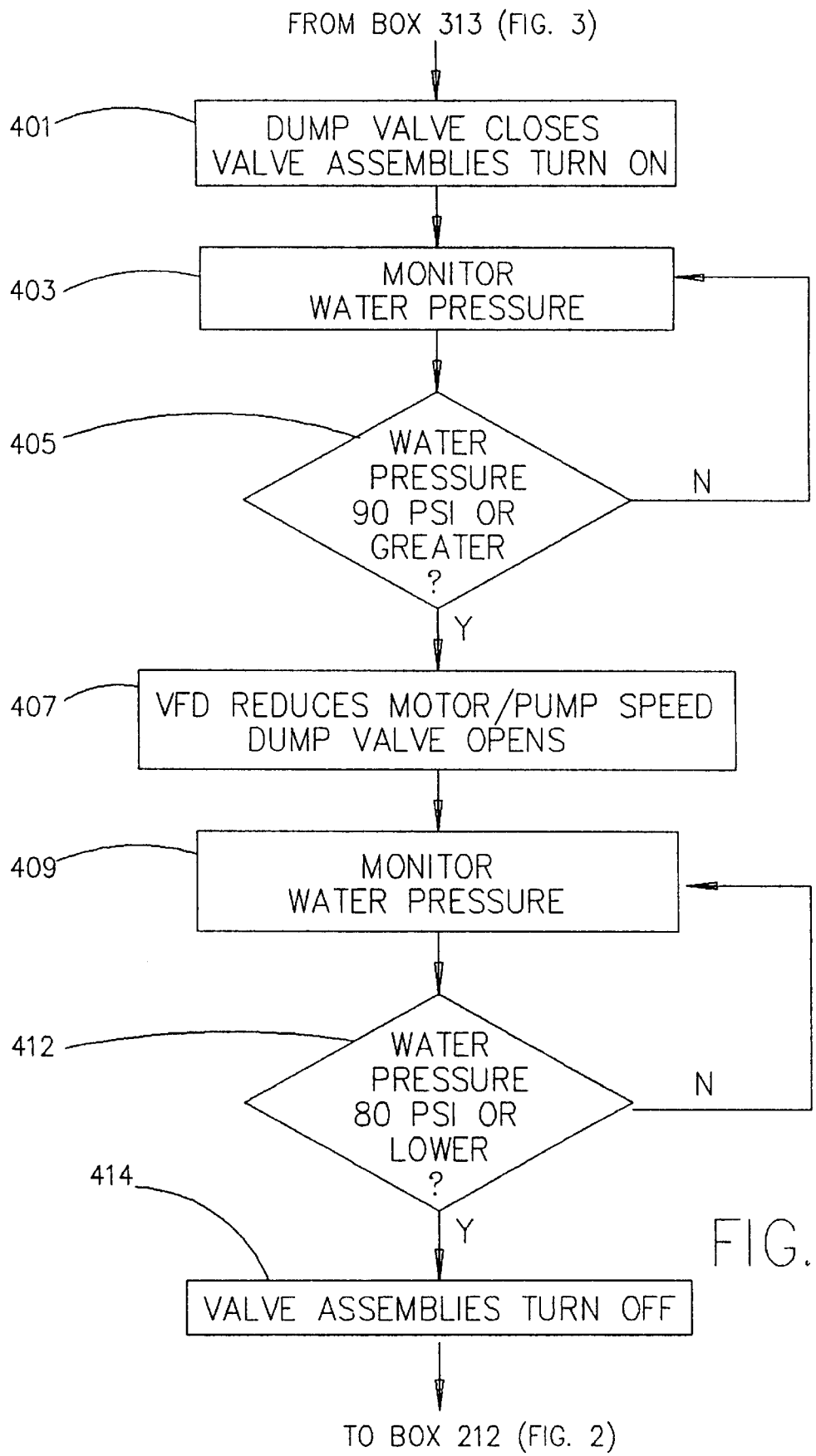

Referring now to FIGS. 1 through 5 of the drawings, in operation, the irrigation sprinkler system 100 starts when the computer 106 commands the variable frequency drive 104 to start up from the off condition and then to increase the rotational speed of the motor and pump assembly 108 at a controlled rate to draw water from the lake 110 to increase the water pressure in the water supply line 114 until the pressure transducer 112 signals the variable frequency drive 104 that the water pressure in the water supply line 114 has reached 90 psi as indicated in the boxes 201, 203, 205 and 207 of FIG. 2.

The initial 90 psi pressure in the water supply line 114 also pressurizes a set 117 of pilot operated, pressure actuated valve assemblies and their associated sprinklers, such as a pilot operated pressure actuated valve assembly 118 and its associated sprinkler 120, at 90 psi. The valve assemblies such as the assembly 118 are disclosed in greater detail in U.S. Pat. No. 3,747,620, which is incorporated herein by reference.

The initial 90 psi pressure on the pressure actuated valve assemblies such as the assembly 118 initializes or prepares the pressure actuated valve assemblies for subsequent sequencing operations. After the initial 90 psi pressure is reached, the computer 106 first commands the variable frequency drive 104 to reduce the rotational speed of the motor and pump assembly 108 at a controlled rate to reduce the water pressure in the water supply line 114 and to open a dump valve 116 to relieve the pressure in the water supply line 114 until the pressure transducer 112 indicates that the pressure in the water supply line 114 has reached 40 psi as indicated in boxes 209, 212 and 215 of FIG. 2. The dump valve 116 is selected to have a dumping rate or water flow capacity substantially less than the pumping capacity of the motor and pump assembly 108. The dump valve 116 is controlled to remain open until commanded to close by the computer 106 and the variable frequency drive 104.

Figure 5:
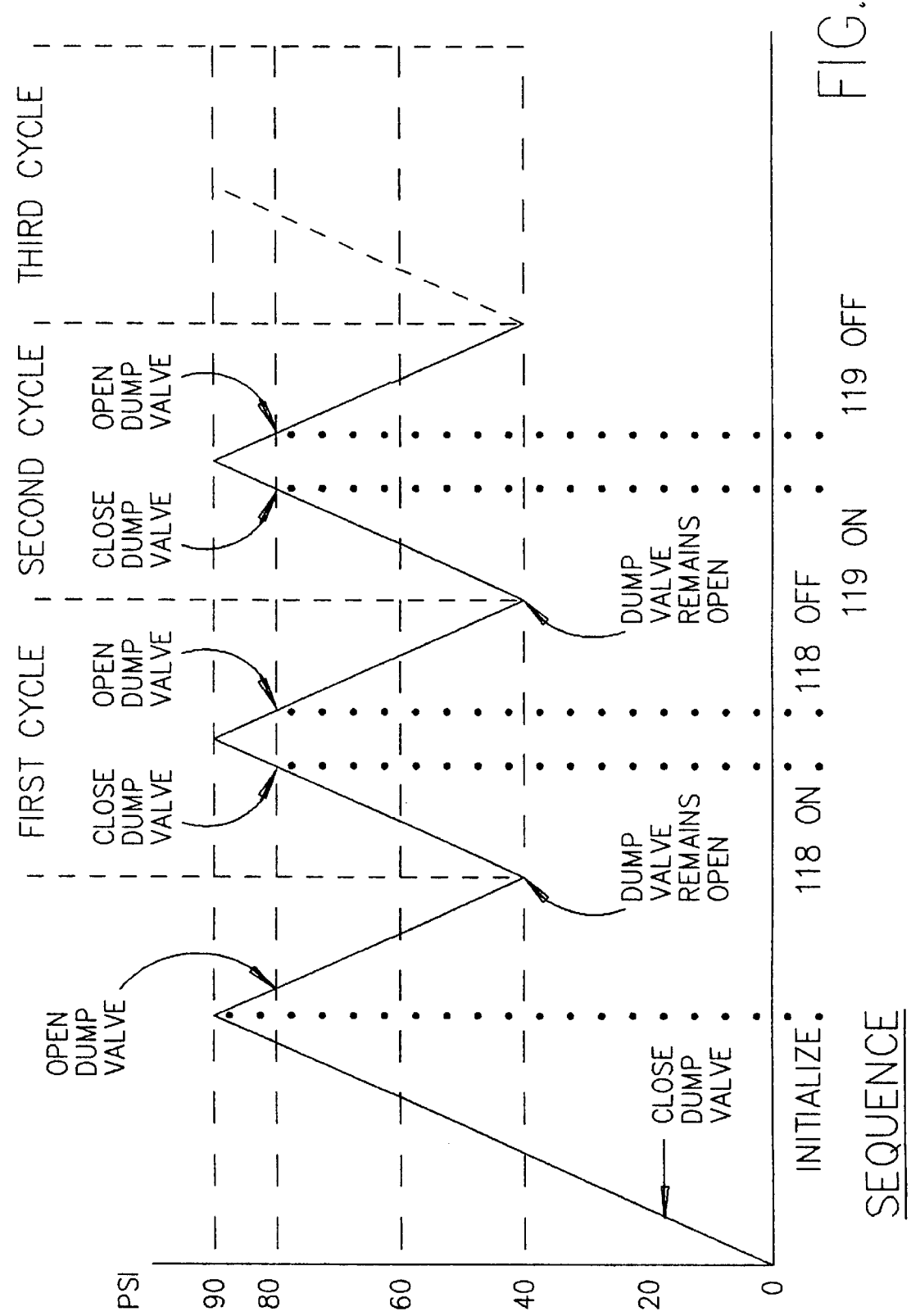
FIG. 5 is a sequencing timing diagram to illustrate the method of operation of the system of FIG. 1.

The 40 psi pressure in the pressure actuated valve assemblies such as the assembly 118 initiates the first step in the two-step operation required to complete one sequencing cycle in the pressure actuated valve assemblies. Substantially immediately after the pressure transducer 112 indicates 40 psi, the computer 106 commands the dump valve 114 to remain open and commands the variable frequency drive 104 to increase the speed of the motor and pump assembly 108 at a controlled rate until the pressure transducer 112 supplies a message to the variable frequency drive 104 that the pressure in the water supply line 114 has reached 60 psi, as indicated in boxes 302, 304 and 306 of FIG. 3. The 60 psi pressure in the pressure actuated valve assemblies such as the assembly 118 completes the second step in the two steps required to complete one sequencing cycle in the pressure actuated valve assemblies. Each of the pressure actuated valve assemblies of the set 117 is set to turn on when the water supply pressure reaches or exceeds 80 psi after a specific designated sequencing cycle has been completed as indicated in boxes 308, 311, 313 and 401, and to turn off whenever the water pressure decreases below 80 psi at the start of the next sequencing cycle as indicated in boxes 403, 405, 407, 409, 412 and 414 of FIG. 4. Thereafter, a second cycle is commenced as indicated by the transition from box 414 back to box 212 of FIG. 2. Also, the sequences are indicated in FIG. 5.

For example, one set of pressure actuated valve assemblies, such as the assembly 118, is set to turn on when the water pressure reaches or exceeds 80 psi only after the completion of the first sequencing cycle, and to be turned off after the start of the second sequencing cycle and to remain off until after all pressure actuated valve assemblies 117 have been reset to zero and until after the water supply pressure has reached or exceeds 80 psi after the completion of another first sequencing cycle.

Another set of pressure actuated valve assemblies such as the valve assembly 119 is set to turn on after the water supply pressure reaches or exceeds 80 psi only after the completion of the second sequencing cycle, and to be turned off after the start of the third sequencing cycle and to remain off until after all pressure actuated valve assemblies of the set 117 have been reset to zero and until after the water supply pressure has reached or exceeds 80 psi after the completion of another second sequencing cycle.

The pressure actuated valve assemblies of the set 117 have a capacity of 39 sequencing cycles, so that there can be 39 separate sets of pressure actuated valve assemblies and associated sprinklers, with each set having its own designated sequence number and its own predetermined time for, and duration of, irrigation sprinkling.

Consider now the case where the computer 106 has been programmed to control the first set of pressure actuated valve assemblies such as the assembly 118, and their associated sprinklers such as the sprinkler 120, to not irrigate, and has been programmed to control the second set of pressure actuated valve assemblies such as the assembly 119, and their associated sprinklers such as a sprinkler 121 to irrigate for a predetermined length of time. After the pressure transducer 112 has provided a message to the variable frequency drive 104 and to the computer 106, that the water supply pressure has reached 60 psi to complete the first sequencing cycle as indicated in FIG. 5, the computer 106 commands the dump valve 116 to remain open and commands the variable frequency drive 104 and the motor and pump assembly 108 to reduce speed at a controlled rate until the pressure transducer 112 reports that the water supply pressure has decreased to 40 psi to complete the first step of the second sequencing cycle.

The computer 106 next commands the variable frequency drive 104 and the motor and pump assembly 108 to increase speed at a controlled rate until the pressure transducer 112 provides a message that the water supply pressure has reached 60 psi to complete the second step of the second sequencing cycle.

The computer 106 then commands the variable frequency drive 104 and the motor and pump assembly 108 to increase speed at a controlled rate until the water supply pressure reaches 80 psi, at which time the computer 106 commands the dump valve 116 to close.

The computer 106 commands the variable frequency drive 104 and the motor and pump assembly 108 to continue increasing speed at a controlled rate until the pressure transducer 112 provides a message to the drive 104 that the water supply pressure has reached the desired pressure for irrigation, usually 90 psi or in excess of 90 psi. All of the sprinklers associated with the pressure actuated valve assemblies of the set 117 designated to turn on at 80 psi after the completion of the second sequencing cycle automatically turn on when the water supply reaches or exceeds 80 psi and to turn off after the water supply pressure decreases below 80 psi to start the third sequencing cycle as indicated in FIG. 5 of the drawings.

After the completion of a selected number of sequencing cycles, the computer 106 commands the variable frequency drive 104 and the motor and pump assembly 108 to reduce speed at a controlled rate, and commands the dump valve 116 to open until the pressure transducer reports a message indicating that the water supply pressure has decreased to 12 psi. The pressure actuated valve assemblies automatically reset to the zero or start-of-sequencing position whenever the water supply pressure decreases to 12 psi or below. The computer 106 then commands the variable frequency drive 104 and the motor and pump assembly 108 to shut down until the start of the next irrigation cycle.

The variable frequency drive 104 and the motor and pump assembly 108 cause the increase or decrease in the water pressure in the water supply line 114 at a controlled rate to achieve proper operation of the system 100, without the unwanted and undesirable water hammer effects. The dump valve 116 is responsive to the water pressure and relieves the water pressure in the water supply line 114 whenever the rotational speed of the motor and pump assembly 108 is decreasing, the dump valve 116 having a maximum flow or discharge rate less than the pumping capacity of the motor and pump assembly 108 to help prevent or at least greatly reduce water hammer effects. Additionally, the computer 106 and the variable frequency drive 104 control the dump valve 116 to change from its open position to its closed position only at designated sufficiently high water pressures so that any decrease in water pressure occurring as a result of closing the dump valve 116 cannot reduce the water pressure in the water supply line 114 to near or below the 40 psi that initiates the first step in the two-step sequencing or indexing operation of the pressure actuated valve assemblies.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. An irrigation sprinkler system including:

pressure actuated and sequenced valve assemblies for controlling a supply of water to selected areas, the pressure actuated and sequenced valve assemblies having an initiating water pressure required to initiate sequencing, comprising:

means for increasing or decreasing a water pressure in lines supplying water to said irrigation sprinkler system;

means for controlling a rate of increase or decrease of said water pressure in said water supply lines;

means for relieving responsive to said water pressure in said water supply lines for relieving said water pressure in said water supply line, said means for relieving having an open and closed position and having a relieving capacity substantially less than the capacity of said means for increasing or decreasing said water pressure in said water supply line; and means for controlling said means for relieving to change from the open to the closed position only at water pressures in said water supply line at pressures substantially different from the initiating water pressure required to initiate sequencing in said pressure actuated and sequenced valve assemblies.

2. A system according to claim 1, wherein said means for increasing or decreasing includes a motor and pump means for the water supply line.

3. A system according to claim 1, wherein said means for controlling the rate of increase or decrease includes a variable frequency drive for controlling said means for increasing or decreasing.

4. A system according to claim 1, wherein said mean for relieving includes a dump valve responsive to said means for controlling.

5. A system according to claim 1, wherein said means for controlling said means for relieving includes computer means.

6. A method of controlling an irrigation sprinkler system having pressure actuated and sequenced valve assemblies for controlling a supply of water to selected areas, comprising:

increasing or decreasing a water pressure in lines supplying water to said irrigation sprinkler system, wherein the increasing or decreasing said water pressure has a capacity of increasing or decreasing said water pressure in said water supply line;

controlling a rate of said increase or decrease of said water pressure in said water supply lines;

responsive to said water pressure in said water supply line, relieving said water pressure in said water supply line, said relieving having a relieving capacity substantially less than the capacity of said increasing or decreasing said water pressure in said water supply line; and controlling said relieving to change a relieving valve from an open to a closed position only at water pressures in said water supply line at pressures substantially different from a water pressure required to initiate sequencing in said pressure actuated and sequenced valve assemblies.

\* \* \* \* \*